United States Patent
Puhl et al.

(10) Patent No.: US 6,223,291 B1
(45) Date of Patent: Apr. 24, 2001

(54) SECURE WIRELESS ELECTRONIC-COMMERCE SYSTEM WITH DIGITAL PRODUCT CERTIFICATES AND DIGITAL LICENSE CERTIFICATES

(75) Inventors: Larry C. Puhl, West Dundee; Dean H. Vogler, Algonquin; Ezzat A. Dabbish, Cary, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/277,304

(22) Filed: Mar. 26, 1999

(51) Int. Cl.[7] .............. H04L 13/00; H04L 9/00
(52) U.S. Cl. .................... 713/201; 713/201
(58) Field of Search .................... 713/200, 201, 713/202

(56) References Cited

U.S. PATENT DOCUMENTS

| | | | |
|---|---|---|---|
| 5,138,712 | * 8/1992 | Corbin | 713/200 |
| 5,260,999 | * 11/1993 | Wyman | 380/4 |
| 5,579,222 | * 11/1996 | Bains et al. | 395/712 |
| 5,671,412 | * 9/1997 | Christiano | 707/104 |
| 5,758,069 | * 5/1998 | Olsen | 713/201 |
| 5,758,088 | * 5/1998 | Bezaire et al. | 709/232 |

* cited by examiner

Primary Examiner—Ly V. Hua
(74) Attorney, Agent, or Firm—Hugh C. Dunlop; Romi N. Bose

(57) ABSTRACT

A wireless electronic commerce system (10) comprising a wireless gateway (18) to a wireless network (19) with which a wireless device (11) having a unique client identifier (ID) is capable of communicating. A server (15) or servers (15 and 16) is/are coupleable to the wireless gateway, delivering content items (e.g. software products) to the wireless device (11) and maintaining digital content certificates for content items and digital license certificates for licenses for the content items. The server maintains, for each wireless client associated with the system, a record of licenses for that client and a record of content items associated with each license.

7 Claims, 5 Drawing Sheets

SECURE WIRELESS ELECTRONIC-COMMERCE SYSTEM WITH DIGITAL PRODUCT CERTIFICATES AND DIGITAL LICENSE CERTIFICATES

FIELD OF THE INVENTION

This invention relates to secure electronic commerce distribution and sales having the ability to offer software enhancements and new features in a simpler, faster, and cheaper method than previously available. Secure electronic commerce brings together three important functions: reprogrammable software or other content (generically referred to also as "product", which includes services); wireless data service; and security (encryption & authentication).

BACKGROUND OF THE INVENTION

Secure electronic commerce offers a way for customers to add or change features in their phone using the convenience of the wireless data service already available in the phone. Moreover, the customer can achieve these goals within minutes and in the comfort of the customer's home or business.

Secure electronic commerce offers many advantages, among them: greater ease of distribution, sale and revenue collection for software-only features; flexible and upgradeable phone platform - this reduces obsolescence; ability to thwart theft of services and cloning; reduced warranty costs in case of software patch updates; and convenience of wireless reprogramming.

SUMMARY OF THE INVENTION

In one aspect, the present invention provides a wireless electronic commerce system comprising a wireless gateway to a wireless network with which a wireless client having a unique client identifier is capable of communicating and at least one server coupleable to the wireless gateway, delivering content items to the wireless device and maintaining digital content certificates for content items and digital license certificates for licenses for the content items. The server maintains, for each wireless client associated with the system, a record of licenses for that client and a record of content items associated with each license.

This record maintained at the server can be used for content item license verification as will be described and is particularly advantageous for repair and recovery as will be described.

In another aspect of the invention, a content item is delivered to a wireless device. The content item is verified with the server. A license associated with the content item is verified and the content item is enabled at the wireless client when the content item and license are verified. A particularly useful (but not essential) feature is that rules can establish that a new license certificate is not required for every new content item.

Glossary of Abbreviations

| | |
|---|---|
| AA | Attribute Authority |
| API | Application Programming Interface |
| CA | Certification Authority |
| DER | Distinguished Encoding Rules (ASN.1) |
| EC | Elliptic Curve |
| GSM | Global System for Mobile Communication |

Glossary of Abbreviations -continued

| | |
|---|---|
| ID | Identifier |
| ME | Mobile Equipment |
| PER | Packed Encoding Rules (ASN.1) |
| PIN | Personal Identification Number |
| PK | Public Key |
| PKI | Public Key Infrastructure |
| RA | Registration Authority |
| RSA | RSA (Rivest, Shamir, Adleman) public key algorithm |
| SHA-1 | Secure Hash Algorithm 1 |
| SIM | Subscriber Identity Module |
| SMS | Short Message Service |
| WAP | Wireless Application Protocol |
| WIM | Wireless Identity Module |
| WML | Wireless Markup Language |
| WML Script | Wireless Markup LanguageScript |
| WDP | Wireless Datagram Protocol |
| WTLS | Wireless Transport Layer Security |

DETAILED DESCRIPTION OF THE DRAWINGS

Figure 1:
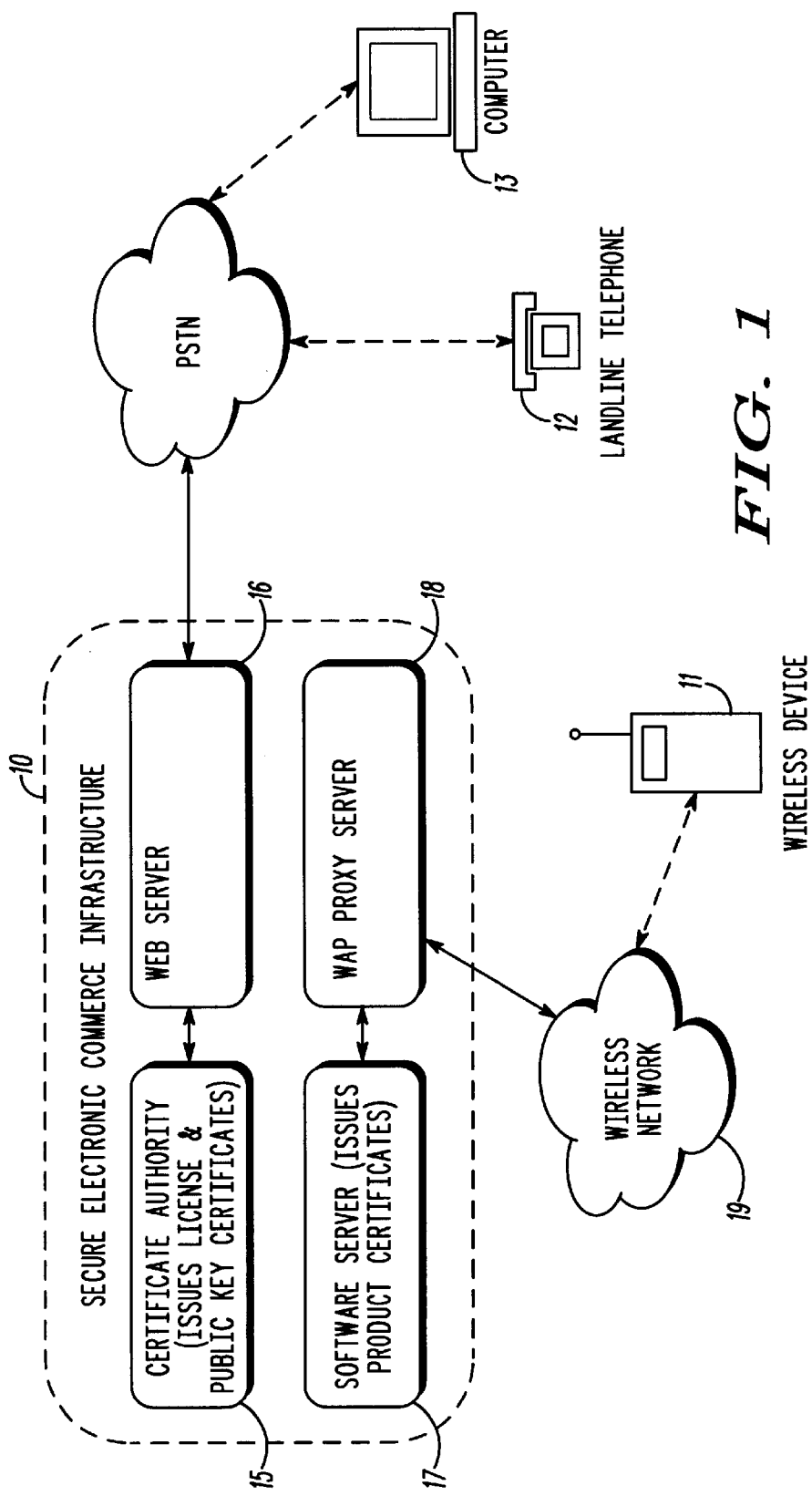
FIG. 1 is a block diagram of a secure wireless electronic commerce system in accordance with a first aspect of the invention.

The overall security model employs cryptographic API and underlying cryptographic toolkits providing a base level of security features, which other stack layers, such as a Wireless Transport Layer Security (WTLS) API, certificate standardization, and wireless applications such as a Wireless Application Protocol (WAP) browser, can build upon. FIG. 1 shows the entities and relationships of the system.

The customer interfaces with the secure electronic commerce system 10 by using a wireless phone 11 or other wireless device plus a landline phone 12 or Internet-accessible computer (dialup, Ethernet, cable, etc.) 13. Vario within the system 10 perform the tasks of secure electro accessing through an Internet connection 13, or using a conventional telephone 12 to talk with an operator, the customer inputs an order to the secure electronic commerce system 10 at the Web server 16.

The web server 16 communicates with the Certificate Authority server 15 to issue a new Product Certificate. This certificate will ensure that only the targeted phone 11 will be able to obtain and use the new feature. Because the phone originally contained a Product Certificate from the Software Server 17 (while in the factory), an audit trail, or accountability, is maintained for the life of the phone. The phone 11 cannot operate software it was not allowed to based on the content of the certificate. The system 10 also contains a copy of the phone's certificate and so it has a record of the capabilities of the phone.

The Certificate Authority server 15 is a server which creates and distributes Public Key Certificates and License Certificates throughout the secure electronic commerce system.

License Certificates allow devices, such as wireless phones, to operate specified software products. License Certificates are issued to each manufactured device prior to leaving the factory, and subsequently when new software is bought. License Certificates the device's serial number as part of the data, which when digitally signed by the CA, will bind the right-to-use software license only to the phone that has that serial number, which by design must be unalterable. Therefore, these certificates can only be used by the targeted party and no one else.

Public Key Certificates enable devices to establish trust through the CA. The CA digitally signs the certificate stating that a given device, denoted by its serial number, has the following public key associated with it.

The Web Server 16 is the front-end server for the secure electronic commerce system. It may be a series of servers (i.e. order entry, billing, order processing, etc.) but conceptually is thought of as one entity. This server contains the order entry system by which customers enter orders. Orders may be taken online through the Web, or by phone via an operator. This server completes the order entry by first verifying the user's information (user name, device serial number, credit card, etc.). The Web server then sends a request to the CA for a new License Certificate. The CA sends the License Certificate to the device. The License Certificate may be "pushed" by the CA or sent on-demand from the device. The device now holds the new License Certificate and has been authorized to use the new software.

The Software Server 17 makes available all of the software products sold by the system provider/operator. It may be a series of servers including various factory servers but conceptually is thought of as one entity. The function of the Software Server 17 is to digitally sign software products and make the software product and corresponding certificate (known as the Product Certificate) available for download.

The function of the WAP Proxy Server 18 is to translate HTML syntax into WML syntax (Internet to WAP protocol) and vice-versa.

Certificates are the cornerstone of the secure electronic commerce system and a description of digital certificates can be found in Draft American National Standard X9.68-199x: Digital Certificates for Mobile, Account Based and High Transaction Volume Financial Systems, available from American Bankers Association Standards Department 1120 Connecticut Avenue., NW Washington DC 20036.

Various of the protocols and techniques in the secure electronic commerce system 10 operate on certificates (either reading/parsing certificates, or adding/modifying/deleting certificates). Every device (servers 16, 17 and 18 and wireless devices 11) in the system has one or more certificates. They all have a trusted root certificate which is the Public Key Certificate of the CA from the CA server 15. Given this, the secure electronic commerce system can be deployed.

There now follows a description of the basic certificate types and the use of certificates in the lifetime of a phone.

A Public Key Certificate contains information that ties a wireless device 11 with its public key. This is accomplished by hashing the relevant data. The certificate is comprised of the aforementioned data plus the hash result. Anyone wishing to verify whether the public key belongs to the device only needs to hash the data again, and verify that it matches the hash result stored with the certificate.

Additionally, the hash is digitally signed by a certifying authority. In this model the CA is the trusted certifying authority. That is, the previously mentioned hash result is signed with the CA's private key. Anyone who has the public key for the CA will be able to verify the encrypted hash. Subsequently, if the verified hash result matches that of the user-computed hash of the certificate data, that tells the user that (i) the certificate must have been signed by the trusted CA since the CA's public key was able to properly verify the signed hash and (ii) the certificate does belong to the subject because the subject's private key can verify data signed by the public key.

A License Certificate contains information that ties a wireless device 11 with certain access rights. In particular, a License Certificate contains, at a minimum, fields for software product and device serial number. The software product field contains a product identifier. This identifier grants the device a license to use the product. A device will be able to run the specified software product if its internal serial number, embedded in the device, matches the License Certificate's serial number. As in the Public Key Certificate, the data in the License Certificate is hashed and signed by the CA. The device will not be able to verify forged License Certificates since it won't be able to validate the certificate to the CA's signature (unless the CA has been compromised).

A Product Certificate ties a content item or subject (e.g. a software product name) to a fingerprint. In this case, the fingerprint is the hash of the software product. Therefore, anyone who has a software product along with its Product Certificate can verify the integrity of the software by comparing a user-computed hash of the software with the hash result stored in the certificate. As in the Public Key Certificate, the hash result in the Product Certificate is digitally signed by the Motorola CA. So, when the user compares the computed hash with the Product Certificate's hash result, a match implies that the software product is the same which the Motorola CA had digitally signed.

Having described the various infrastructure devices and the role that certificates play in the system, the way in which the secure electronic commerce system is deployed can now be described.

The following sections describe briefly how the system functions using examples that occur for a device. The examples chosen are for a phone, and include what happens when the phone is setup in the factory, what happens when a user turns on and uses the phone, and what happens when a user wants to obtain a new feature.

Each phone in the factory has certain some unique characteristics built-in before the unit is shipped. Physically, the phone must contain: (i) ROM available to run unalterable certificate verification code; (ii) EEPROM available to store certificates (access to the certificates storage area must be restricted) and (iii) an unalterable unique serial number (either in ROM, laser-etched, write-once memory, etc.)

Figure 2:
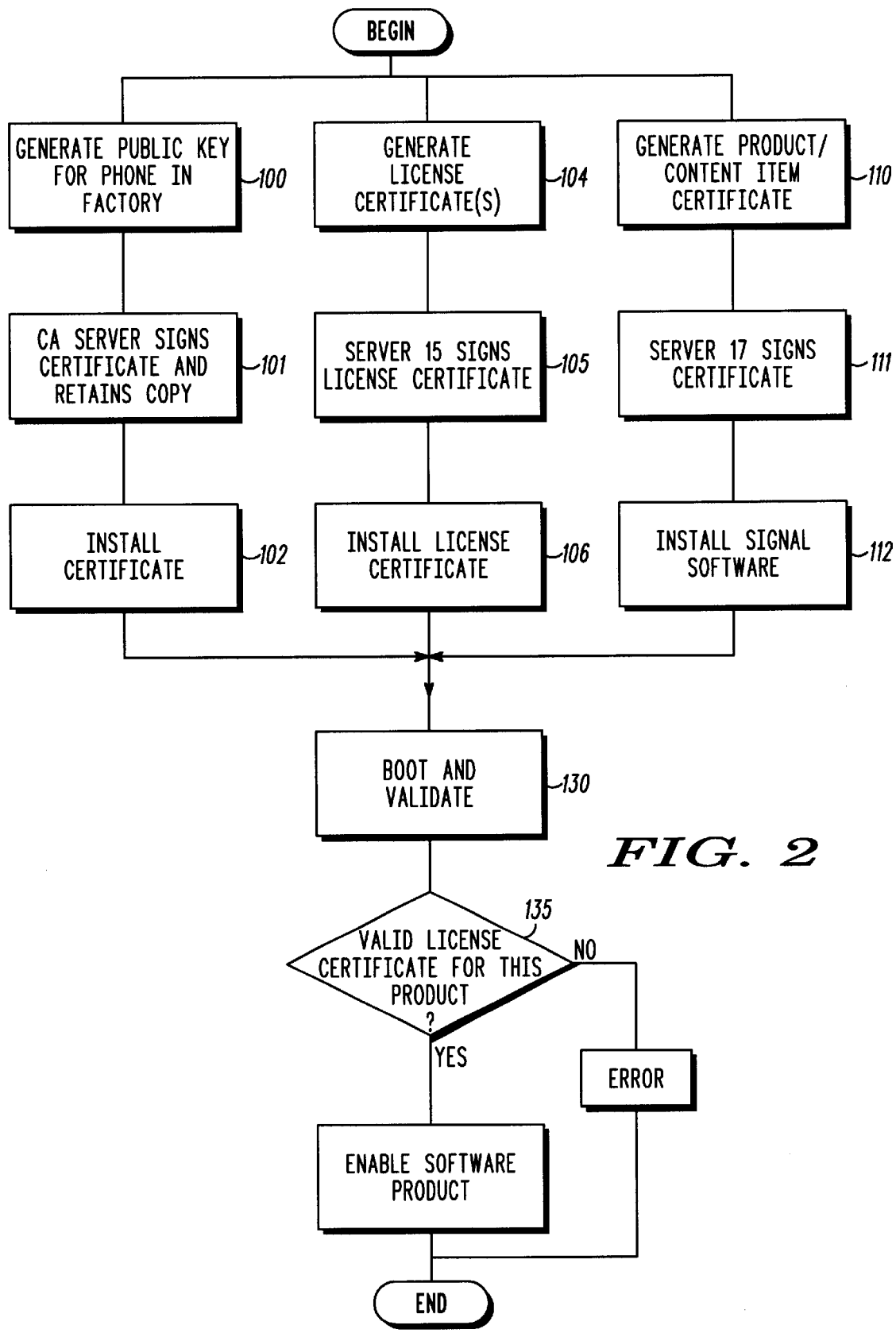
FIG. 2 is a flow diagram illustrating software installation and boot-up steps for the wireless client device of FIG. 1.
Figure 3:
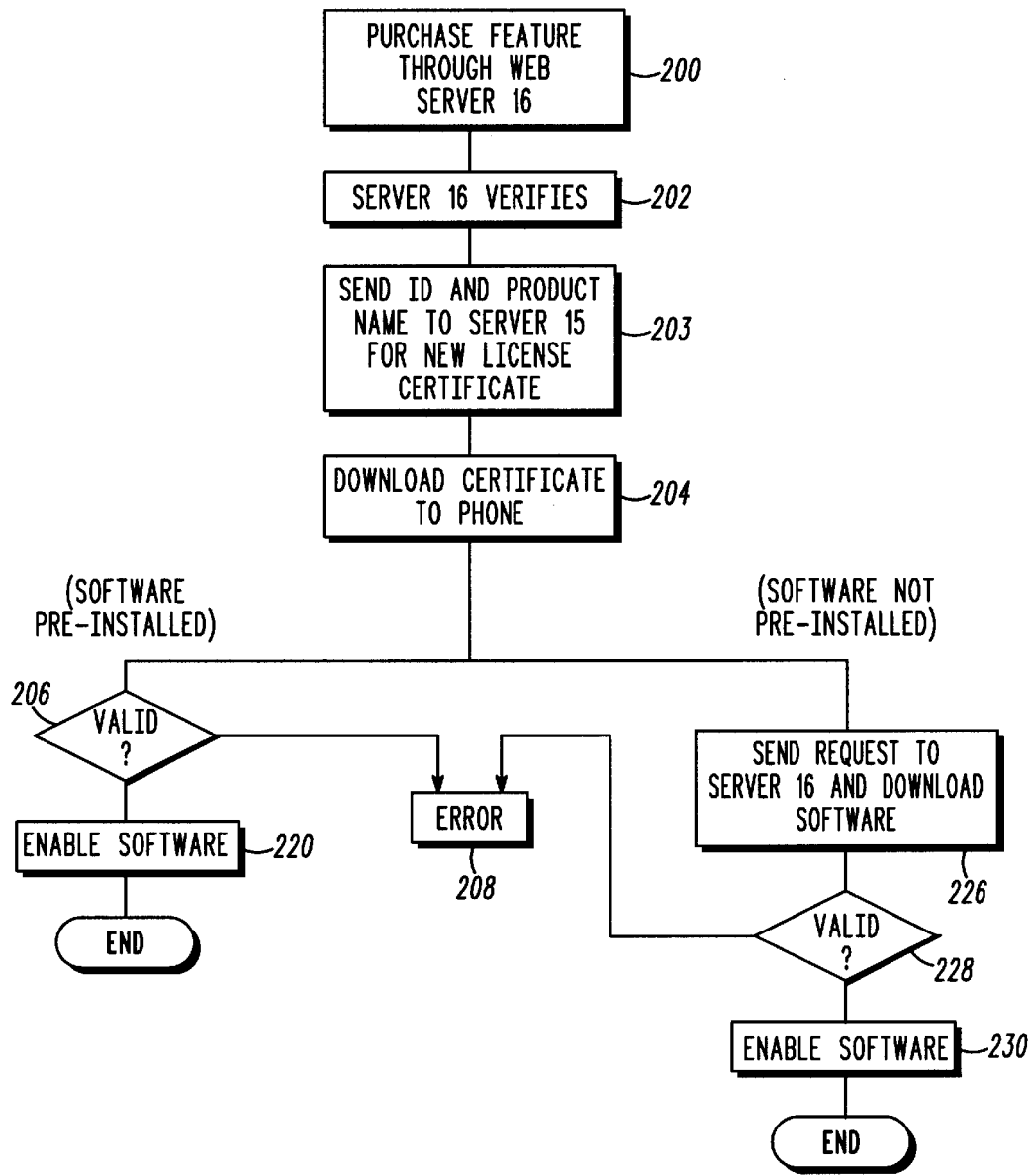
FIG. 3 is a flow diagram illustrating steps in a process of software download to a wireless device in the field or enabling of software in a wireless device in the field.

At the factory, a Public Key Certificate is generated for the phone (step 100 of FIG. 2). This can be generated by the Software Server 17, the CA server 15, or by the phone itself. The CA server 15 digitally signs the certificate and retains a copy of it (step 101). The phone is installed with its own Public Key Certificate, plus the CA's Public Key Certificate (102). (The CA, being the root certifying authority, signs its own certificate.) A key assumption is that inside the factory there is a trusted network. In this environment, the generation of the phone's Public Key Certificate, its signing by the CA, and the certificate and CA's public key transference into the phone are deemed to be secure.

Also at the factory one or more License Certificates are issued (step 104). The factory sends a request to the CA server 15 (or the software server 17 under the root authority of the CA server 15) to sign a License Certificate (step 105). The factory provides the CA information on which software licenses or products the phone is supposed to have along with the phone's serial number. The License Certificate includes the following information: (i) the CA's identification (the issuer); (ii) the serial number of the phone (the subject); (iii) a list of software products the phone is licensed to run; and (iv) a signed (encrypted with CA's private key) digest (software hash) of the aforementioned components. The license certificate is installed in the phone at step 106.

The License Certificate may contain multiple licenses in one certificate, or there may be multiple License Certificates with one license per certificate. Both methods are allowed. The CA itself will retain a copy of the phone's License Certificate(s).

Now, the phone enters the software programming phase. The phone must contains various amounts of software - some base version plus some (optional) additional features, depending on what was ordered. The factory must install the correct software package(s) into the phone. The software packages include the software itself plus a Product Certificate (or more generally a content item certificate). The Software Server 17 generates a Product Certificate (step 110) for each software product under the same root authority as the CA. Both the software and Product Certificate are stored on the Software Server 17. The Software Server 17 is responsible for managing the software products and making them available for download. The software package and its certificates (i.e. digitally signed software) is installed in step 112.

The purpose of the certificate is to bind (i.e associate) the software product to a particular name (e.g. software product name and major version number). This association may be in the form of a look-up list of product names associated with the certificate of a product name and a predefined rule identifying permitted new product names (e.g. Browser version 1. x permits all future versions of Browser between version 1.0 and version 2.0). The certificate contains the name of the software along with a hash of the software product. Anyone wishing to validate the integrity of the software can hash the software and compare it to the one found in the Product Certificate. The certificate is signed by the Software Server. The Software Server itself has a Public Key Certificate signed by the CA, so a line of trust is maintained.

The Product Certificate includes the following information: (i) the Software Server's identification (the issuer); (ii) the software products name (the subject); (iii) a hash of the software product; and (iv) a signed (encrypted with Software Server's private key) digest of the above components.

The Software Server 17 retains a copy of the Product Certificates. It should be noted that the CA 16 may also perform the function of the Software Server 17, in which case the CA will be responsible for all three types of certificates.

The phone leaves the factory installed with: (i) the CA's Public Key Certificate; (ii) the phone's Public Key Certificate; (iii) one or more License Certificates; and (iv) one or more Product Certificates.

A series of steps takes place every time a user turns on the phone. First, the phone's boot software validates all of its Product Certificates (step 130). That is, a hash is computed for each software product in the phone and compared against the hash stored in the certificate. Also, a line of trust to the CA must be established. Since the Product Certificate was signed by a Software Server, not the CA, the phone will obtain the Software Server's Public Key Certificate from the CA (this should only occur one time after which the phone will store the Software Server's Public Key Certificate in memory). Next, the phone's boot software validates (step 135) all of its License Certificates. That it is, a comparison between the phone's unalterable serial number and the serial number stored in the License Certificate(s) associated with the products is made. If they match then the phone is allowed to operate the software products identified in the License Certificate. The software products identified in this certificate must match the software products name field in the Product Certificates. In both steps, the phone's boot software compares the digital signature of the certificates with the CA's Public Key Certificate (which was installed in the factory) to ensure that forged certificates were not installed.

In the event that a user wants to modify the phone, such as enabling an option or purchasing a new feature (see Examples below), a new License Certificate is obtained along with the software product itself plus its Product Certificate. The following steps take place. First, the user purchases the feature through the Web Server 16. Whether by phone or Web access, the user submits the necessary information to the Web Server 16, including name, address, credit card number, the phone's serial number, and desired product to purchase (step 16). The Web Server 16 verifies the information and creates an order ticket which is also given to the customer. Assuming the customers credit has been validated, the Web Server 16 sends the phone's serial number along with the name of the software product purchased, to the CA server 15 to obtain a new License Certificate. The License Certificate is made available to the phone to download (step 204). The user may initiate a sequence to obtain it. The phone validates the new License Certificate. If the software product was installed in the factory but not enabled (no license certificate), it will now be enabled (step 220). If the software product is not found in the phone, it will send a request to the Software Server to obtain it (step 226).

As an optional step, the Software Server 17 may be configured to send software products encrypted and only to authenticated users, in order to prevent overloading of the wireless network and to prevent unauthorized users from obtaining the software code (despite the fact that the phone cannot run the software anyway without a valid License Certificate). This is done by establishing a WTLS connection between the Software Server 17 and the phone 11 via the WAP proxy server 18. Each party has a Public Key Certificate signed by a common CA, so they trust each other's certificates. Using a key exchange algorithm, a secret key is derived and used for encrypting the software product and Product Certificate. The Software Server then sends the software product and Product Certificate over the air to the phone, the phone validates the Product Certificate and the purchase is complete.

Note that in this model, if the download is interrupted or the software is corrupted, the user can retry the download any number of times.

In the event that the phone has to be brought in to a repair shop, there are a number of features in the secure electronic commerce system available to make updates or modifications to the phone a painless one. For example, if for some reason a different phone is issued to the user, the repair shop could transfer all of the contents of the existing phone (software and Product Certificates) into the new one. The new phone will not be able to run the software until a new set of License Certificates is generated for that phone's serial number. The repair shop requests new License Certificates from the CA using the repair shop's Public Key Certificate as proof to the CA that it is empowered to do so. The CA has on record the License Certificates for the existing phone. New License Certificates are issued for the new phone, and the existing phone's License Certificates are put on a certificate revocation list. If for some reason the repair shop needed to copy software into the new phone and was unable to copy it from the existing phone, the software (and Product Certificate) could still be downloaded from the Software Server as described previously.

By implementing the secure electronic commerce system, new features, updated software, and software patches can be delivered to the phone in a timely efficient manner for the customer. The customer benefits from the ease of performing the tasks, and the almost immediate cycle time to achieve it. Furthermore, the security features built into the system will reduce incidents of theft of service or cloning.

The following examples help clarify what potential solutions are available in a secure electronic commerce environment for some real world situations.

EXAMPLE 1

Acquiring an Application not Currently in the Phone

A user is travelling overseas and wants to have access to a voice activated German/English translator on their phone. The user can purchase the German/English translator software product from the manufacturer or retailer. The user will download the application into the phone and the German/English translator is operated locally on the phone, rather than through the service provider's infrastucture. This is more cost effective if the user plans to use the feature on a regular basis. The user feels a sense of ownership. As long as the user keeps the phone, he/she owns the software. The software operates locally in the phone. The user does not access the feature over the air, thereby eliminating any potential out-of-service conditions, bandwidth or throughput issues, or unexpected infrastructure downtime. The user pays the manufacturer or the retailer for the feature, rather than the service provider.

EXAMPLE 2

Enhanced Phone Feature

A user wants to be able to use a new Web browser now available for the phone, either buyer downloading the software (if the phone did not contain the software when purchased) or by enabling access rights to the feature already stored within the phone. The user connects the web server 16 (or 1-800 number), follows instructions to purchase additional options for the phone, and waits a short time for the software to be downloaded, or enabled, with the new Web browser capability. The user gains instant satisfaction by accessing the feature minutes after the purchase is made. The cost of the feature is lower than it would otherwise be because the overhead to bring the feature to the user via electronic download is low. Because the transaction is authenticated by the certificate authority via the CA server 15, theft of service is virtually eliminated.

EXAMPLE 3

Software Patch Update

A software patch is issued to the field to be installed in an existing phones (e.g. under warranty for no charge). The user is instructed how to enable the phone to begin a download containing the updated software. Another option is that the service provider can automatically update phones while the phone is in service, without the user aware of the upgrade. The user does not need to physically return the unit to a service shop. The user's phone is updated in a matter of minutes, rather than days spent in a service shop. An instant electronic record of the software download is retained in the system 10, rather than relying on field service reports. Certain upgrades can be done automatically without the user's consent, thereby eliminating any, service interruptions. The cost is minimal because no service shop is involved in the procedure.

EXAMPLE 4

Metered Service

A user wants to access an audio book in his/her car during the commute to/from work. The user can purchase an audio book from a service provider. Access may be gained by means of a secure data service connection which allows the metered service (either per book or per minute). Among other options, two-way communications allow the user to suspend/resume the transmission. This is a new type of service not achievable without secure electronic commerce.

Thus a wireless electronic commerce system has been described having a wireless gateway 18 to a wireless network 19 with which a wireless client device 11 having a unique client identifier is capable of communicating. At least one server has been described coupleable to the wireless gateway, delivering content items to the wireless device and maintaining digital content certificates for content items and digital license certificates for licenses for the content items. In the preferred embodiment the server 17 delivers the content and the CA server 15 maintains the digital license certificates. The at least one server maintains, for each wireless client associated with the system, a record of licenses for that client and a record of content items associated with each license. In other words, the CA server 15 maintains a database or list correlating wireless client IDs with licenses (or license certificates) for each client ID and content items (e.g. software products) associated with the licenses.

It has been described that the wireless client is able to request digital license certificate verification for a new content item when the new content item is associated with an existing digital license certificate that is associated with the client identifier. Content of a first wireless client with a first identifier is preferably able to be replicated in a second wireless client with a second identifier by reloading the content to the second wireless client; replacing, in the at least one server, a first association between the first identifier and corresponding records of first client licenses and first client content items, with a new association between the second identifier and the corresponding records of first client licenses and first client content items; and verifying, for the second client, the first client licenses and first client content items, whereby the second client is able to assume the functionality of the first client.

Also described is a method of operating a wireless electronic commerce system comprising: maintaining at at least one server, digital content certificates for content items and digital license certificates for licenses associated with the content items; maintaining at the at least one server, for each wireless client associated with the system, a record of licenses for that client and a record of content items associated with each license; establishing communication between the at least one server and a wireless client device via a wireless gateway; delivering a content item to the wireless device having a unique identifier within the system; verifying the content item with the at least one server; verifying a license associated with the content item; and enabling the content item at the wireless client when the content item and license are verified.

The license for the content item is preferably verified when a name for the content item is pre-associated with a digital license certificate associated with the unique identifier for the wireless device. Alternatively the name for the content item satisfies a predefined rule of a digital license certificate associated with the unique identifier for the wireless device, for example it falls within a range of permitted version numbers identifying it as an upgrade of a content item pre-associated with the digital license certificate.

The secure electronic commerce system described offers a solution to enabling software sales over wireless networks. The system is a robust, efficient, and user-friendly method to provide e-commerce services for customers.

The system has been described with a Wireless Application Protocol (WAP) server or gateway 18, but it will be understood that any wireless network gateway can be used, WAP being merely a convenient protocol. Alternative aspects of the system are now described, also in the context of a WAP protocol and it will be understood that other protocols can be used.

Further details of the WAP server and WAP layers of the secure wireless electronic commerce system are now described. A set of WAP protocols in transport, security, transaction, session and application layers are described in the document "Wireless Application Protocol Architecture Specification" [WAPARCH], WAP Forum, 30Apr.1998. WAP security functionality includes the Wireless Transport Layer Security [WAPWTLS]WAP Forum, 30Apr.1998 and application level security, accessible using the Wireless Markup Language Script [WMLScript]. The security provided in WAP can be of various levels. In the simplest case anonymous key exchange is used for creation of an encrypted channel between server and client; in the next level a server provides a certificate mapping back to an entity trusted by the client; and finally the client itself may possess a private key and public key certificate enabling it to identify itself to other entities in the network. The infrastructure and procedures required to enable the trust relationships needed for authentication of servers and clients are described in greater detail here. The term "server" used here is not limited to a dedicated WAP gateway but may include third parties and content/service providers using the WAP protocols. The specifications for the aforementioned and other WAP protocol layers are found at URL: http://www.wapforum.org/.

In addition to the above-mentioned documents, reference can be made to: "Wireless Control Message Protocol Specification", [WAPWCMP] WAP Forum, Apr. 30,1998; WAP Identity Module Specification [WIM], WAP Forum, Mar. 12 1999; Digital Certificates for Mobile, Account Based, and High Transaction Volume Financial Systems [X968], Mar. 1,1999 ANSI draft; "Standard Specifications For Public Key Cryptography", IEEE P1363/D1a (Draft Version 1a) [P1363], Feb. 1998. URL: http://grouper.ieee.org/groups/1363/; PKCS #1: RSA Encryption Standard", version 1.5 [PKCS1], RSA Laboratories, Nov. 1993; PKCS #15: and Cryptographic Token Information Standard" [PKCS 15], working draft version 1.0, RSA Laboratories, Nov. 1998.

To describe further aspects of the electronic commerce system, the following are now described: the security domains; the attributes to be distributed/protected in the system; attribute ownership assigned to domains (note some attributes are owned by more than one domain); and the architecture for the enrollment and authentication of domain members and assignment of attribute.

A "domain", or "security domain", is a public key infrastructure under the control of a single authority and using a defined internal naming scheme, algorithms, and policies. Domain authority flows for a domain root certification authority having a globally unique name. This allows domains to generate agreements and hook together forming a global PKI. An entity that has been enrolled in a domain by the certifying of the public key that the entity owns within the domain is a "domain member". The following are the possible WAP domains, some or all of which will be referred to: manufacturer(s); network; operator(s); wireless service provider(s); content/services providers (e.g., banking domain); trusted third party domains (e.g., an independent certification agent or authority); device owner (fleet operator domain); and device user (personal domain).

An "attribute" is either a characteristic (which can be considered to be a name) or a right (i.e. a permission, for example a permission to access a purchased service). Examples of attributes, are owned objects (e.g. directories & files, hardware and & interfaces) and owned rights/permissions (e.g. make call; establish network connection; send SMS message; read/write/update files & directories; configure device hardware; access network management station.

In order to implement this security infrastructure, the WAP Public Key system 10 enrolls and authenticates WAP domain members and distribute attributes. Note that the word "distribute" includes "distribute to purchaser"; i.e., subscribers may be purchasing attributes such as access to content or services.

The WAP PKI architecture consists of autonomous security domains tied together by cross-certification. Such cross-certification is a part of service roaming agreements between service providers and system operators. Cross certification is the process by which two domain root CA's issue one another cross-certificates; thereby authorizing one another's root certificates (keys). Cross-certificates generally contain the address of one or more inter-domain validation servers and may also contain other information related to the cross-certification agreements. For the wireless industry cross-certification can be similar to creation of roaming agreements. Within a security domain the algorithms, naming scheme, and policies of that domain are determined by the owner of the domain. During the cross-certification procedure, domains agree on inter-operability issues and configure validation servers to allow certificate validation to be performed.

Classes of WAP operation are: class 0: anonymous authentication only; class 1: server authentication only; and class 2: server and client authentication. Class 0 is not of concern here as it does not involve a PKI. Class 1 involves the authentication of servers to clients. These servers may be owned by the wireless service provider or may be third party servers offering their services in the network. By including these third party servers in the WAP PKI the wireless service provider indicates a special status or stamp of approval to these services. Class 2 operation allows a client (mobile subscriber) to enroll as a member in the domain and obtain benefits of being in such a domain. This may involve special agreements with third parties such as discounts or special services. Domain members may be issued small attribute certificates, tied to their domain private key, that indicate purchased services or special rights being granted.

Attribute certificates are of two types: (i) purchased service or product certificates, which are like monthly subscriptions and do not require special revocation procedures; and (ii) system operations permissions, which are attributes issued to allow users special system configuration rights. These latter may be used by wireless service provider personnel or issued to authorized subscribers.

Above, several domains have been identified. The usage of some of these domains is now described.

The device owner domain is a domain used to set up device users and user profiles/privileges without wireless service provider involvement. This could be done by having the service provider give the device owner a service provider domain identity and attributes to modify their account configuration. Or the device owner could be made an attribute authority in the service provider domain. The device owner does not necessarily need his own domain, although in a large fleet where device owner needs to issue certificates to employees allowing them certain rights it is preferable to have such a domain. The system allows for device owner domains, although they are not expected to be deployed initially as simpler means (using service provider domain) exist for the required functionality.

Manufacturer domain is used for device bootstrap, device OS code upgrades & features.

Wireless service provider domain and/or network operator domain can be used for WAP gateway certification, content provider certification, subscriber feature distribution, subscriber identification (bind to account), WTA scripts, over air system modifications, distribution of certificates to employees to allow system configuration.

Content/service provider domains can be used for security conscious entities (e.g. banks) to run their own domains that cross-certify to operate with service provider domain or enroll wireless users directly.

Note that a user may be a member (have a key certified) in any domain. A domain is used to issue certificates to grant permissions to others in a system; permissions can be controlled on the device in a simpler manner.

Figure 4:
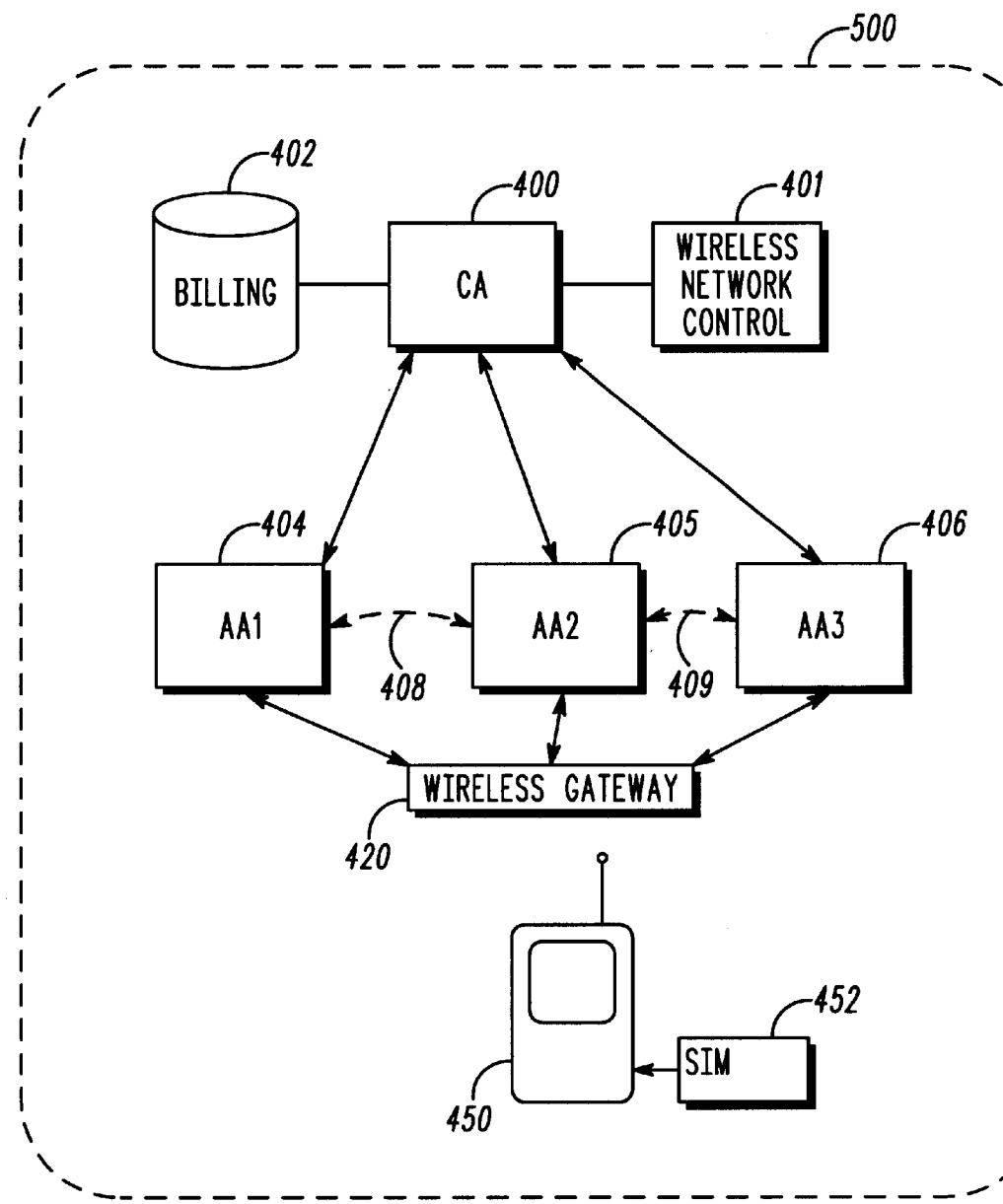
FIG. 4 is a block diagram of a secure wireless electronic commerce system in accordance with a second aspect of the invention.

Focus of further discussion herein is directed to the service provider, network operator, and manufacturer domains, with particular reference to FIG. 4.

FIG. 4 illustrates a CA 400 (implemented as a server). A certification authority is an entity that issues/updates/revokes public key bearing certificates in response to authenticated requests from legitimate registration authorities. The CA holds a private key used to sign domain member key bearing certificates. The CA is managed by a wireless service provider or network operator controlling and operating a wireless network via a wireless network controller 401 and generating bills for customers via billing computer 402.

A plurality of Attribute Authorities 404, 405 and 406 are shown (three are illustrated, but there may be many). An Attribute Authority is an entity that generates certificates assigning attributes to domain members. Examples might be a mobile telephone manufacturer 404, a book merchant 405 and a wireless software supplier 406.

The AAs can communicate with the end user (client) device 450 via a wireless gateway 420.

The client device 450 preferably (but not necessarily) has a Subscriber Identity Module (SIM) 452. This is a smart card in a wireless system holding subscriber identity and authentication information. The SIM card can also be used to run applications needing a secure environment. The client device preferably also has a WAP Identity Module (WIM) that provides an interface for service relating to the use of the WAP security layer as well as data storage services. The WIM uses PKCS 15 for object formats. The WIM may be an interface layer to the SIM card 452, or it may be a SIM or other card with a native WIM interface on it, or a software token on the wireless device 450.

All items of FIG. 4 belong to a domain 500, which in this embodiment is a wireless network operator domain. The domain 500 may have a higher registration authority, that is an entity authorized to make requests to issue/revoke/update certificates to a CA or AA. The registration authority can be considered similar to an account manager in function and is responsible for member enrollment and/or attribute assignments. Enrollment is the process by which a user public key is certified in a domain by the issuance of a domain certificate containing this key.

Server 400 is a validation server. A validation servers is a server that is configured to validate certificates for domain members. Domains that cross-certify are expected to provide accessible validation servers that obtain and validate certificate chains. This service is important when there are domains with local naming schemes. Since these schemes may not be understood by an outside domain, it is necessary for the validation service to be provided. A validation server that is configured to communicate with one or more outside domains is an inter-domain validation server. In addition validation servers may provide local domain validation for thin clients that are domain members but do not have the ability to obtain and validate a certificate chain on their It is possible to have multiple wireless service provider domains stored in the system. If a customer switches providers in a system with a WIM identity card having personalization and key information on it certain issues arise. If the user simply obtains another card from the new provider all the personalization information will be lost. It is therefore good practice, although not essential, that service provider specific information is separated from personalization information not dependent on the service provider. It is also preferable to provide a means for the user to create a WIM software token to be used to initialize a new WIM card.

It is advantageous for certain businesses wishing to sell services or content to mobile subscribers to have their own security domain. This may be required for certain financial services for risk management reasons. The keys and applications for these domains must be separated from other domains in such a way that the owner is confident that no tampering is possible. Although it is possible to store certificates and keys from any domain in the WIM, this separation can be implemented in various ways that need not be described. In addition to stored object separation the device must insure that domain applications cannot be tampered with.

Any domain member may become an attribute authority. Wireless service providers distribute system management attributes to merchants that they bring into their domain who can sell their attributes- i.e. sell a purchased service ticket (e.g. for new software as described above or for other content or services).

There are three types of payloads: compact payloads, organizational payloads of which WAP payloads are one type, and domain specific payloads that are valid only in a local domain.

In order for merchants operating AA servers 404–406 to define simple attributes for the service/content they sell, it is necessary to have a method to indicate that a given attribute payload is a merchant payload and to indicate the particular merchant. Since the payloads are not expected to be understood by anyone but the merchant the actual structure of the payload is not material. There are three ways that merchant attribute payloads may be identified: (i) if the merchant has an organizational identifier it can define its types under this identifier; (ii) merchant identifiers can be assigned under the WAP OID; (iii) domains can defines and deploy a merchant ID scheme for their domain specific payloads.

Attribute certificates are preferably time-limited, i.e have an expiry date and be subject to periodic renewal. At any time when a certificate is verified, verification fails if an expiry time digitally embedded in the certificate has expired. A mobile client checks the validity of a merchant server (404-406) with the network upon first use or periodically. The client (either the wireless device 450 or the SIM 452 can be considered a client) contacts the validation server via the wireless gateway 420 for this purpose. In addition the wireless service provider may post a web site listing the status of domain merchants. Such a site could also indicate if the merchant is no longer a trusted domain member; i.e., if their certificate has been revoked for some reason.

Figure 5:
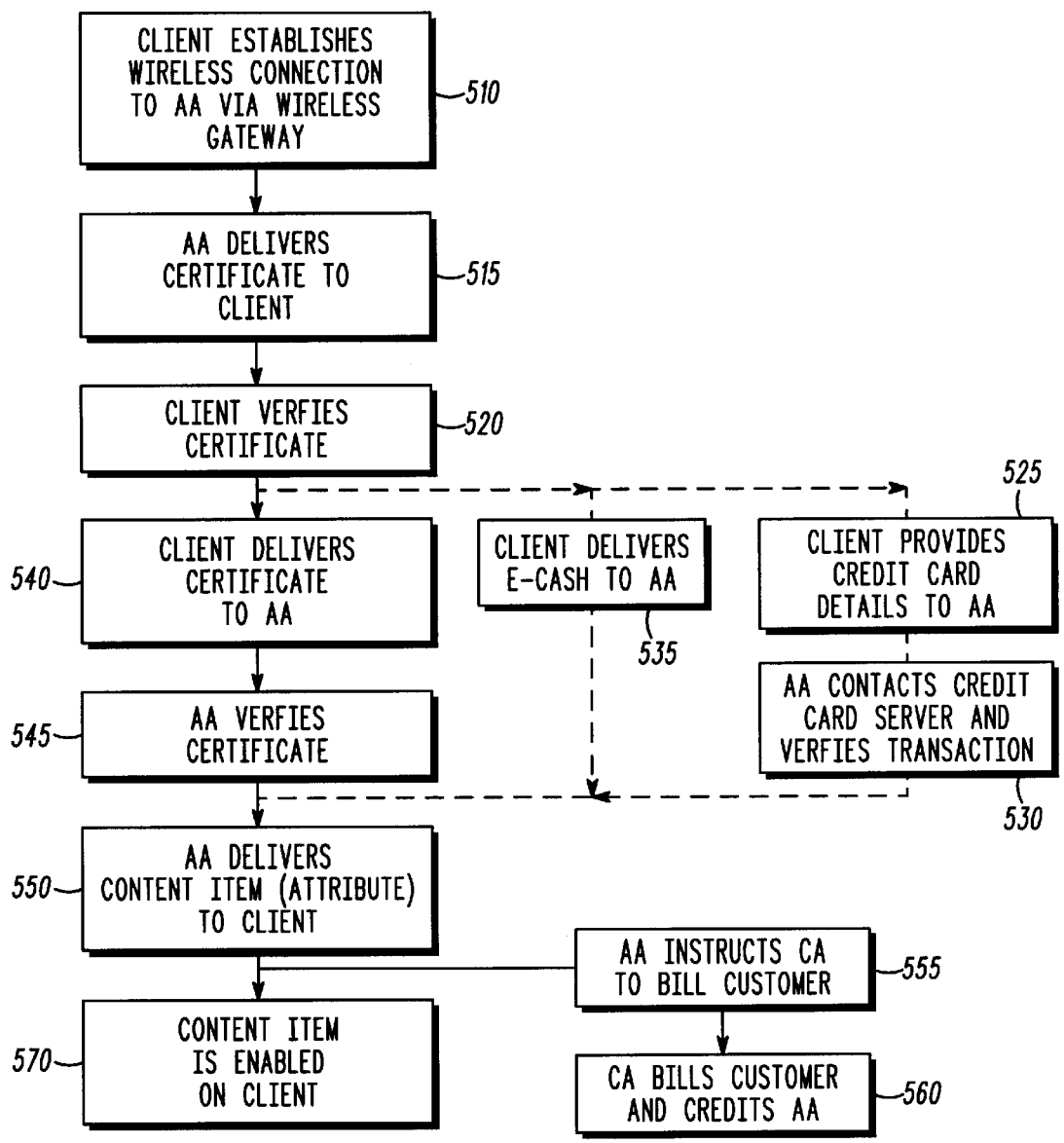
FIG. 5 is a flow diagram illustrating steps of operation of the system of FIG. 4.

The steps by which a merchant (i.e. an AA) or other network element having the capacity of an AA delivers content to a client and receives payment for that content is now described with reference to FIG. 5.

Initially, a client (450 or 452) establishes connection in step 510 with an AA server 404 via the wireless gateway 420. The AA delivers a digital certificate to the client in step 515. The client verifies the AA certificate in step 520. This is achieved at the client in the same manner as other certificate verification already described and is achievable because the client already has installed the public key certificate of the CA 400. It uses this public key certificate to verify the AA. The reason for this verification is because the client wishes to have confirmation that the AA is trusted by the wireless service provider. This will give the user confidence that the content to be delivered by the AA will operate when delivered to the wireless device 450, that it will not cause disruption, that the fee to be paid is as advertised, that upgrades will be available, etc. There are many reasons why the user may wish to ensure that the AA is certified by the wireless service provider.

Next, an exchange occurs between the client and the AA to deliver payment to the AA for the content that the client is about to receive. This transaction can take one of several forms. The AA informs the client what the fee is for the content to be received and the client, if the user so chooses, authorizes payment of that fee. For example, the client can provide credit card details (step 535) and the AA server can establish a connection with a credit card server to execute a transaction (step 530). Alternatively, the client can deliver electronic cash to the AA server (step 535 (which need not be described). In a more preferred alternative arrangement, the client delivers a certificate to the AA that is certified within the wireless service provider domain 500, i.e. is certified by the CA 400 and has the public key certificate of the CA 400 (step 540). The AA server verifies this certificate in step 545 (using the root public key certificate that it already has stored at the AA server) and the AA is ready to deliver the content item (attribute) to the client. Upon delivery of the content item to the client (step 550) the AA instructs the CA to bill the customer for the predetermined fee (step 555) and the CA 400 instructs the billing computer 401 to add the fee to the customer's bill (step 560). Meanwhile (step 570) the content item is enabled on the client.

Enabling of the content item can take many forms, for example executing a software application or an upgrade or patch to a software application, or displaying a newspaper, or delivering a stock quote service, or opening wireless web access to a streaming video service or music service, or delivering an electronic airline ticket or a ticket to a concert, or many other examples. In effect, the various AAs 404, 405, 406 all provide a virtual wireless shopping mall with a common billing mechanism, which is the billing mechanism of the wireless service provider.

If steps 535 or 525 are executed, it is not strictly necessary for the AA to perform online certificate validation of the client's certificate (steps 540 and 545), but is preferable to do so anyway. As an alternative to the step of verifying the AA certificate (step 520) the client can just check the last posted AA list (or AA revocation list). In addition the domain provides a service that notifies merchants when a client certificate is revoked, so as an alternative to step 545, the AA can check this list. Of course, if the client is charged by electronic cash or credit card, steps 555 and 560 are omitted.

Although several domains may be useful, it is not necessary to have users become members of these domains by obtaining a user key. In the case of a phone, as already described, the manufacturer can enroll users if direct sales to a user of device feature upgrades are intended. This could, however, also be done through distribution through the service provider domain or assignment to device identifiers. Managing user keys may be less preferable in the manufacturer domain. This domain can preferably be used to authenticate features and upgrade scripts from the manufacturer.

If the network operator runs a security domain, client keys may be required, but only for clients that are to be authorized to perform network operations from the mobile device (i.e., network operator employees). General client authentication to the network operator is not strictly necessary.

The case of the wireless service provider assigning keys to users is of particular interest. The client keys are distributed in the WIM card when service is purchased. The client key in the wireless service provider domain allows a member of this domain to assert an identity that is bound to the account with the provider. The service provider or its authorized third parties may then sell content/services in the domain. The client key also allows certain clients (say, service provider employees) to use the system to identify themselves to the network as having network operations permissions.

For service and content providers other than the wireless provider that require separate security domains client keys are preferably issued and stored in the WIM. Domains are permitted to specify any naming scheme consistent with their network and are responsible for assuring that this scheme is internally consistent. A domain's internal directory service must be configured to resolve local domain names. Names may be of multiple type including email addresses, IP addresses, DNS names, and account numbers. The business deploying (or contracting for deployment of) a domain may configure the naming mechanism to suit their business and system needs.

The AAs 404, 405 and 406 can communicate between each other via links 408 and 409 to exchange electronic vouchers. For example, AA 404 can advertise to its clients that purchase of its services earns for the client a credit for the services offered by AA 405. When a client purchases a content item from AA 404, AA 404 generates an automatic voucher that it delivers to AA 405, identifying the client by ID and the credit to be attributed to that client. When the client establishes a connection to AA 405, the client is informed of the discount from the fee of AA 405 that this particular client has earned. If the client purchases a service from AA 405, the latter can charge AA 404 for the value of the discount voucher or a portion thereof. There are many variations on this scheme that will be readily apparent to one of ordinary skill in the art. For example, points can be accumulated by the billing computer at the CA 400 that can be used at any of the AAs 404–406. Alternatively, the voucher can be transferred to the client 450 or 452 instead of between the AAs so that the client can deliver the voucher to the next AA in the virtual wireless mall. This latter scheme is particularly simple to implement using the already describes public key certificate common to all the members of the domain 500, because any AA in the domain can readily verify the authentiity of the voucher.

Further miscellaneous details of the overall secure wireless electronic commerce system are now given for completeness.

Directories are organized as: domain authority name->fully qualified local descriptive name->key hash, certificate hash, or key ID or domain authority name->key hash, certificate hash. Within a domain the domain authority name is implicit. A fully qualified local name is a local name that is unique within the domain; in some cases this is a combination of the issuer and subject names in a certificate (subject relative to issuer). The use of the certificate or key hash alone (no descriptive name part) for entity names is less preferable due to the difficulties it creates in directory lookup and certificate chain validation.

An issuer below root has a name consisting of either a certificate hash and an optional descriptive name, a key hash and an optional descriptive name, or an integer key identifier and a descriptive name. Use of the integer key identifier and descriptive name allows for shorter and more human readable names.

The validator has means to obtain the necessary certificate path when a transaction requires that a certificate chain be processed. In many cases the end entity certificate itself will not be sent, only a name or names that allow the validator to obtain any required certificates. Within a domain this can be made simple by using a deterministic path naming scheme that allows the certificate validation path to be obtained directly from the (issuer, subject) pair. If the naming scheme does not do this internal to a certificate then a means external to the certificate must be provided to obtain the proper path. For validation between cross-certified domains it is recommended that a domain provide a secure validation service for its certificates. If a domain is to validate certificates from other domains internally then it must understand the naming schemes and algorithms used in the other domains.

In certain cases a CA may have more than one valid certificate listed at a given time. This could happen during a scheduled re-key of the CA. This creates a possible problem when trying to follow a certificate chain as at some point the chain allows multiple possibilities. There are several methods for dealing with this: (i) trial and error, which is inefficient due to the need to check multiple signatures for a match; (ii) use of a name type containing a key or certificate hash for CA's and AA's. This resolves ambiguity but makes names larger; (iii) use a key identifier with a descriptive name . This latter is the preferred method.

Given that some devices may not be capable of processing certificate chains for intra-domain validation, a validation service is defined in X9.68. This service is realized by providing validation servers in a domain. The addresses of these may be indicated as payloads in CA certificates or configured in some other manner. The client of the service must be able to verify the signature on the response so it must have the validation server certificate or be able to verify this certificate. A thin client receives a certificate that it wishes to validate along with an indication of the domain authority of the certificate; the domain is its own. The client sends a validation request to a validation server. The server sends back a signed validation response.

For inter-domain validation, domains make certain services available to other domains. A cross-certificate indicates where these services may be obtained by providing an address for servers offering such services. The validation service operates between a validation client, which may be an intra-domain validation server, and an inter-domain validation server. An inter-domain validation server is expected to be able to contact and verify the authenticity (signature) of a response from another domain's validation server(s). Note that this implies that inter-domain validation servers must be capable of using the algorithms from the other domain. Inter-domain validation servers are members of multiple domains and therefore are able to verify signatures of other domains. A thin client receives a certificate that it wishes to validate along with the domain authority of the certificate; the certificate domain is not its own. The client sends a validation request to a domain validation server. Note these servers can be indicated in the root certificate as payloads or stored elsewhere. The validation server notes that the domain is external. It determines if a cross-certificate with the indicated domain exists. If not a validation failure response is returned to the client. (Note that this third step can be skipped if the client is aware of the address of an inter-domain validation server). If a cross-certificate exists and the server is an inter-domain validation server it handles the request itself, otherwise it signs and sends a validation request to an inter-domain validation server listed in the cross certificate. The inter-domain validation server authenticates the request and either verifies the certificate itself or passes the request to an internal validation server in the other domain. The result is signed and returned to the validation server the client originally contacted. The validation server authenticates the response, signs it itself, and returns it to the client.

The validation service allows an entity from one domain to request that a certificate from another domain be authenticated. A reply of invalid is required to be returned unless the server can ascertain that the certificate is currently valid. A reason for the failure is preferably provided.

Each domain selects the algorithms to be used internally for digital signatures, data encipherment, key encipherment, and key agreement. In addition the maximum key size that can be used inside the domain is given by the domain root CA key size. Domain members must have the cryptographic software/hardware implementing the domain algorithms with the maximum key size. In addition a domain member must have a securely loaded and stored domain root CA certificate or a condensed form of the domain root CA certificate information.

A domain is defined so as to fix the algorithms used within for efficiency reasons. As a domain selects RSA with a given root key size the algorithm and key size are known for every client in that domain. This makes the impact of supporting another algorithm for a mobile client explicit- every new domain the client joins is potentially a new algorithm. In fact, for security reasons, some domains may not even allow another domains code to be used even if the algorithm is the same.

A domain root CA indicates the algorithms, internal naming scheme, and policies in effect in the domain. Policies include such information on what guarantee the domain makes of member identity binding to account and what procedures and guarantees are made for third parties issuing attribute certificates in the domain. In addition specific policies for each cross-certification agreement are maintained.

The process of cross-certification is one in which two autonomous security grant formal recognition to one another. This is done digitally by each domain creating and signing a cross-certificate object containing the other domains root certificate (or its hash). In addition the addresses of inter-domain validation servers and indications of contractual agreements may be contained.

For service provider domains in systems with SIM or WIM smart cards that are personalized at the time of service subscription, member enrollment comprises storing the member certificate and key on the WIM card.

For systems not having a smart card, the keys and certificate are stored in a WIM software token. Member keys are protected by passphrase information. This information is concatenated with a stored secret value for the device and run through a secure hash in order to generate the encryption/decryption key for use in protecting the user private key. Member certificates are also kept with the member's account and entered into the service provider member directory. In some systems the actual member certificate may not be stored on the WIM itself but maintained in the system only. For this usage the member certificate can be used as a secure container for account information and a client need only to present his identity to the system; the system obtains the required certificate. For domains other than the service provider the enrollment process requires that a secure manner to store the keys in the WIM be defined and that each domain is assured of information System bootstrap involves the loading of the domain root certificates and client keys. Note that in addition to a client signature key, keys to be used for data encipherment, key encipherment, and key agreement can also be loaded. Signature keys for clients must be used only for signatures. Keys for the other purposes are also loaded. Initially the manufacturer domain root certificate is loaded into the mobile device. This certificate is used to enable secure loading of other domain root certificates if necessary. In systems not having a secure service provider provisioning scheme in place, the manufacturers provide certificates to service providers giving the service provider a provisioning attribute. This attribute allows a service provider to install their root certificate in the phone.

It is necessary to securely load and store domain certificates. Initially the device manufacturer certificate is loaded into the device as indicated above. Next service provider and network operator certificates are loaded. Once valid service provider and network operator certificates are loaded these domains gain control of attributes their domains own. Manufacturer domain loses control of any attributes it does not own in a provisioned device.

For systems with SIM cards, the wireless service provider root certificate and client key and certificate are distributed on the card before it is issued to the subscriber. The means used to generate and bind the client key insure that only one binding is possible for a card and that signature keys cannot be determined by the service provider or their employees. The personalization process binds the public key (and hence the private key) for a card to an individual account.

For systems without identity cards, the service provider and network operator certificates are loaded using the manufacturer root certificate to secure the loading process. The manufacturer issues certificates to service providers allowing them to sign key loading scripts. The device must insure that only a properly authenticated request be used to load a domain root certificate.

During a planned re-key, each CA or AA simply re-issues certificates. A device must be able to accept a certificate change order for a certificate signed by the owner of that certificate.

When a CA or AA key other than root is compromised, messages from root can instruct the WIM to replace the key with a new key. Using root for this purpose means lower level CA's need not have their own disaster recovery keys, only root requires a key for this purpose.

When a root key is compromised it is desirable to have procedures in place allowing recovery without re-enrollment of all domain members. For this reason each domain preferably has a disaster recovery public key for a domain securely stored in the WIM along with the domain root public key. The private disaster recovery key must be kept in a separate system that is not connected to any network unless disaster recovery is underway. It is desirable that the location for this key be physically separate from the domain root key. Disaster recovery messages are messages instructing the WIM to automatically replace a root key. It is required that both the current root key and the disaster recovery key sign the root public key change message. Receipt of a request for which one signature checks but the other is invalid must cause the WIM to be disabled. It is also required that a message disabling the SIM/WIM card entirely, signed by the disaster recovery key, be supported. In summary, the disaster recovery process is: message to change root signed by current root key and disaster key; (ii) message to fully disable WIM may be signed by either root or disaster recovery key; and (iii) receipt of a partially invalid request must cause WIM to be disabled.

A member device has keys associated with it that may be used for transactions or authentication. These keys are generally protected by a PIN code and some "maximum number of tries" deactivation protocol. It is desirable that when a device is reported stolen, and the report itself has been authenticated in some manner, the system be able to cause a card to clear keys remotely if someone attempts to use the stolen device.

Thus a method of conducting transactions in a wireless electronic commerce system has been described, where the system comprises a wireless network operator certification authority having a root public key certificate and at least one attribute authority having a digital certificate that is dependent from the root public key certificate, where the attribute authority is accessible by a wireless client device via a wireless network. According to the method described, a wireless communication is established between the wireless client device (450 or 452) and the attribute authority (404, 405 or 405). The digital certificate is delivered from the attribute authority to the wireless device, the attribute authority is verified to the wireless client device using the digital certificate and the root public key certificate preloaded in the wireless client device under authority of the wireless network operator. An attribute is delivered to the wireless client device over the wireless network and ultimately enabled at the wireless client device.

Payment for the attribute may be transacted by delivering a second digital certificate from the wireless client device to the attribute authority and verifying the second digital certificate using the root public key certificate from the certification authority. An instruction is preferably transferred from the attribute authority to a billing computer of the wireless network operator to add an item to a wireless network operator bill for the wireless client device.

The second digital certificate may be pre-loaded into the subscriber identity module by the wireless network operator or pre-loaded into a wireless communicator under authority of the wireless network operator.

Also described is a method of conducting transactions in a wireless electronic commerce system comprising a wireless network operator certification authority having a root public key certificate and at least first and second attribute authorities, having respective first and second digital certificates that are dependent from the root public key certificate, where the attribute authorities are accessible by a wireless client device via a wireless network. The method includes establishing a wireless communication between the wireless client device and the first attribute authority; delivering a first attribute to the wireless client device over the wireless network; generating an electronic voucher verifiable by the second attribute authority; establishing a wireless communication between the wireless client device and the second attribute authority; requesting a second attribute from the second attribute authority; identifying the electronic voucher at the second attribute authority; and delivering the second attribute from the second attribute authority to the wireless device. The step of generating an electronic voucher verifiable by the second attribute authority may include delivering the electronic voucher from the first attribute authority to the second attribute authority via a connection therebetween or may include delivering the electronic voucher from the first attribute authority to the second attribute authority via the wireless client.

Also described is a wireless electronic commerce system comprising: a wireless network operator certification authority server having a root public key certificate; at least one attribute authority server coupleable to the wireless network operator certification authority server, having a digital certificate that is dependent from the root public key certificate; a wireless client device having pre-loaded therein the root public key certificate; a wireless network coupling the wireless client device to the at least one attribute authority server; verification means in the wireless client device for verifying the digital certificate to the wireless client device using the root public key certificate pre-loaded in the wireless client device; means (e.g. server 18 or gateway 420) associated with the attribute authority server for sending and means (e.g. a radio receiver in the wireless device 450) for receiving an attribute over the wireless network; and means for enabling the attribute at the wireless client device.

The above description has been given by way of example only. Other aspects, objects and advantages of the invention and modifications of detail will be apparent to one of ordinary skill in the art reading the teaching herein. All such modifications are included within the scope and spirit of the claims.

What is claimed is:

1. A wireless electronic commerce system comprising:
   a wireless gateway to a wireless network with which a wireless client device having a unique client identifier is capable of communicating; and
   at least one server coupleable to the wireless gateway, delivering content items to the wireless client device and maintaining digital content certificates for content items, the digital content certificates establishing that the content items are available on the wireless client device and digital license certificates for licenses for the content items to enable only a specified device to operate a specified content item such that the digital license certificate can be used only by the specified device and no other device,
   wherein the at least one server maintains, for each wireless client device associated with the system, a record of the licenses for the content items available on that wireless client device and a record of the content items associated with each of the licenses, the record of the licenses and the record of the content items enabling content item license verification on the wireless client device.

2. The wireless electronic commerce system of claim 1, wherein a wireless client device is able to request digital license certificate verification for a new content item when the new content item is associated with an existing digital license certificate that is associated with the client identifier.

3. The wireless electronic commerce system of claim 1, wherein content of a first wireless client device with a first identifier is able to be replicated in a second wireless client device with a second identifier by:
   a reloading the content to the second wireless client device;
   replacing, in the at least one server, a first association between the first identifier and corresponding records of first client licenses and first client content items, with a new association between the second identifier and the corresponding records of first client licenses and first client content items; and
   verifying, for the second wireless client device, the first client licenses and first client content items, whereby the second wireless client device is able to assume the functionality of the first wireless client device.

4. A method of operating a wireless electronic commerce system, comprising:
   maintaining at least one server, digital content certificates for content items and digital license certificates for licenses associated with the content items, the digital content certificates establishing that the content items are available on the wireless client device and the digital license certificates to enable only a specified device to operate a specified content item such that the digital license certificate can be used only by the specified device and no other device;
   maintaining at the at least one server, for each wireless client device associated with the system, a record of licenses for that wireless client device and a record of content items associated with each license, the record of the licenses and the record of the content items enabling content item license verification on each wireless client device;
   establishing communication between the at least one server and a wireless client device via a wireless gateway;
   delivering a content item to the wireless client device having a unique identifier within the system;
   verifying the content item with the at least one server;
   verifying a license associated with the content item;

enabling the content item at the wireless client device when the content item and license are verified.

5. The method of claim 4, wherein the license for the content item is verified when a name for the content item is pre-associated with a digital license certificate associated with the unique identifier for the wireless client device.

6. The method of claim 4, wherein the license for the content item is verified when a name for the content item satisfies a predefined rule of a digital license certificate associated with the unique identifier for the wireless client device.

7. The method of claim 6, wherein the predefined rule includes determining whether the name of content item identifies it as an upgrade of a content item pre-associated with the digital license certificate.

* * * * *